(12) United States Patent
Adams

(10) Patent No.: US 9,752,749 B2
(45) Date of Patent: Sep. 5, 2017

(54) LENS SYSTEM FOR LIGHTING FIXTURE

(75) Inventor: Stephen P. Adams, Mesa, AZ (US)

(73) Assignee: JST Performance, LLC, Gilbert, AZ (US)

( * ) Notice: Subject to any disclaimer, the term of this patent is extended or adjusted under 35 U.S.C. 154(b) by 281 days.

(21) Appl. No.: 13/440,488

(22) Filed: Apr. 5, 2012

(65) Prior Publication Data

US 2013/0265755 A1    Oct. 10, 2013

(51) Int. Cl.
| | | |
|---|---|---|
| *F21V 5/04* | (2006.01) | |
| *B60Q 1/04* | (2006.01) | |
| *B60Q 1/068* | (2006.01) | |
| *F21S 8/10* | (2006.01) | |
| *F21V 5/00* | (2015.01) | |
| *F21V 17/00* | (2006.01) | |
| *F21V 21/30* | (2006.01) | |
| *F21W 101/02* | (2006.01) | |
| *F21W 101/04* | (2006.01) | |
| *F21V 29/507* | (2015.01) | |
| *F21Y 105/10* | (2016.01) | |
| *F21Y 115/10* | (2016.01) | |

(52) U.S. Cl.
CPC ............. *F21V 5/04* (2013.01); *B60Q 1/0483* (2013.01); *B60Q 1/068* (2013.01); *F21S 48/1154* (2013.01); *F21S 48/1208* (2013.01); *F21S 48/1275* (2013.01); *F21S 48/1291* (2013.01); *F21V 5/004* (2013.01); *F21V 5/007* (2013.01); *F21V 17/002* (2013.01); *F21S 48/33* (2013.01); *F21V 21/30* (2013.01); *F21V 29/507* (2015.01); *F21W 2101/02* (2013.01); *F21W 2101/04* (2013.01); *F21Y 2105/10* (2016.08); *F21Y 2115/10* (2016.08)

(58) Field of Classification Search
CPC .......... F21V 17/005; F21V 5/04; F21V 5/007; F21V 29/004; F21V 5/008; F21V 5/045; F21V 29/507; F21V 17/002; F21V 5/004; B60Q 1/0483; B60Q 1/068; F21S 48/1154; F21S 48/1208; F21S 48/1275; F21S 48/1291; F21S 48/33
USPC ....... 362/521, 235, 268, 297, 329–332, 224, 362/236–246
See application file for complete search history.

(56) References Cited

U.S. PATENT DOCUMENTS

| | | | |
|---|---|---|---|
| 4,993,807 A | | 2/1991 | Sakakibara |
| 5,001,610 A | * | 3/1991 | Otaka ........................ 362/510 |
| 5,528,474 A | | 6/1996 | Roney et al. |
| 6,139,173 A | * | 10/2000 | Hanamori ................... 362/522 |
| 6,352,359 B1 | | 3/2002 | Shie et al. |
| 6,502,956 B1 | | 1/2003 | Wu |
| 6,654,172 B2 | * | 11/2003 | Pond et al. ................. 359/619 |
| 6,707,613 B2 | * | 3/2004 | Fujimoto ............... B41J 2/451 359/619 |
| 7,153,000 B2 | | 12/2006 | Park et al. |

(Continued)

FOREIGN PATENT DOCUMENTS

WO    WO 2013034523 A1 *  3/2013

*Primary Examiner* — Anh Mai
*Assistant Examiner* — Arman B Fallahkhair

(57) ABSTRACT

A lens system including one or more insertable lenses that are secured from movement relative to a protective transparent media that itself is securable to a lighting enclosure with a light source in the lighting enclosure. The insertable lenses can be removable or alternately oriented to alter the distribution of light or the projection direction of light, respectively.

20 Claims, 4 Drawing Sheets

(56) References Cited

U.S. PATENT DOCUMENTS

| | | | |
|---|---|---|---|
| D563,595 S * | 3/2008 | Egawa et al. | D26/122 |
| 7,483,220 B2 * | 1/2009 | Kittelmann et al. | 359/742 |
| 7,766,509 B1 | 8/2010 | Laporte | |
| 7,896,521 B2 | 3/2011 | Becker et al. | |
| 8,007,127 B2 | 8/2011 | Kim et al. | |
| 8,029,157 B2 * | 10/2011 | Li | F21V 5/048 |
| | | | 362/245 |
| 8,684,559 B2 * | 4/2014 | Van De Ven | F21V 5/002 |
| | | | 257/98 |
| 8,813,399 B2 * | 8/2014 | Miedema et al. | 40/549 |
| 9,328,902 B2 * | 5/2016 | Eckert | F21V 7/0083 |
| 9,360,185 B2 * | 6/2016 | Demuynck | F21V 13/04 |
| 2010/0014289 A1 * | 1/2010 | Thomas et al. | 362/235 |
| 2011/0194279 A1 * | 8/2011 | Kuo | 362/235 |
| 2011/0194282 A1 * | 8/2011 | Paik et al. | 362/245 |
| 2011/0194287 A1 * | 8/2011 | Georgitsis et al. | 362/277 |
| 2012/0319616 A1 * | 12/2012 | Quilici et al. | 315/294 |
| 2013/0265760 A1 * | 10/2013 | Demuynck et al. | 362/240 |

\* cited by examiner though including discussion of the source of light itself, and the direction of the light emitted.

LENS SYSTEM FOR LIGHTING FIXTURE

BACKGROUND OF THE INVENTION

1. Field of the Invention

The present invention relates to lens systems for refracting and distributing emitted light and particularly relates to lens systems allowing change in the refraction and distribution characteristic of light emitted from a lighting fixture.

2. Discussion of the Prior Art

Exterior vehicle lighting including the efficient generation, distribution, or direction of lighting facilitates both the ability for the driver to see, and for the vehicle to be seen, in low ambient light conditions. Selection or design of vehicle lighting component including without limitation, the light source, reflector(s), and lens, controls the ability to direct and distribute light. Filament lighting is an appropriate light source in some applications, but alternate light sources, including Light Emitting Diodes (LEDs), also find favor in certain applications of vehicle lighting systems as LEDs present advantages over filament based lamp lighting.

Filament based lamp lighting has inherent drawbacks. First, a significant portion of the light generated from a filament light radiates outward and must be redirected by reflectors and a Fresnel or collimating lens design. Fresnel lenses include annular portions including an inner lens portion inside an outer lens portion wherein the outer lens portion will have incrementally steep lens portion precisely stepped to facilitate the focusing of light rays emitted at a greater angle of incidence from the light source. Second, filament lighting provides but one source of light. If the bulb ruptures or filament expires, the light source loses all utility. Hence the need for alternate light sources.

The use of LEDs however also presents challenges related to directing or distributing generated light. One challenge is the relative brightness of a typical single LED, which is significantly less than a capable filament based bulb and less than required for a vehicle lamp. LEDs are therefore included in plurality to generate sufficient light and match the light production of prior art filament type vehicle lamps. But, several or a plurality of LEDs generate light from multiple points rather than one and the LED lighting system designer must therefore consider the direction or distribution of light emitted from a plurality of LED sources. Accordingly, the art includes solutions to problems concerning the direction or distribution of light generated from a plurality of LEDs.

As examples, U.S. Pat. Nos. 7,766,509 and 7,959,326 disclose a base structure for mounting a plurality of LEDs where the base structure has a plurality of orientable lenses each individually affixed about a single LED. Each orientable lens is securely attached to the base structure and has a primary reflector and a refracting lens that direct light emitted from a single LED. Similarly, U.S. Pat. No. 8,029,157 discloses a LED light fixture having multiple refractory lenses positioned relative to and directly above light sources. The multiple lenses are connected to the circuit board or base that secures the LED light source modules.

U.S. Pat. No. 7,153,000 discloses a multi-lens LED with an intermediate layer positioned between the multiple lenses in order to radiate light emitted from an LED chip in a desired direction and/or at a desired beam angle. A first lens is centered behind the LED chip. The second lens has a concave structure and surrounds the first lens and an intermediate layer is interposed between the first and second lenses, so that light emitted from the LED chip can be radiated at a wide beam angle.

The aforementioned patents disclose devices that are suited for a particular purpose and disclose appropriate solutions for that purpose. Each patent discloses a light system that includes directing the light from individual LEDs by using one or more lenses secured relative to a light source. It would be advantages to have a light system and components that allows changing the projection direction of light or its diffusion, or creating portions of directed or diffused light and changing the portions thereof.

SUMMARY OF THE INVENTION

It is not the intention to provide an exhaustive summary of every aspect or object of the invention. Illustrative aspects and details will be discussed and described where and how they fit the purposes of describing and enabling the invention. Accordingly, this summary should not be deemed as limiting the scope of the description or the claims.

The invention may be embodied in a lens system and used with a variety of light enclosures or light fixtures. The lens system includes one or more insertable lenses that are secured from movement relative to a protective transparent media that itself is securable to a lighting enclosure. The one or more insertable lenses create directed or diffused lighting characteristics, or are alternately removable to enable the inherent lighting characteristic of the light source modules within the lighting enclosure.

The one or more insertable lenses have a shape or finish that accommodates a surface on the protective transparent media. A structure such as an edge or boss located on the transparent media, and a complementary edge or notch located on the lenses (or vice-versa), make contact to deter relative movement between the one or more insertable lenses and the transparent media. The structure or edge to deter relative movement can be implemented as a positive or negative structure on the transparent media that is received by a complementary structure on a lens (or vice-versa).

DESCRIPTION OF THE EMBODIMENTS

Figure 1:
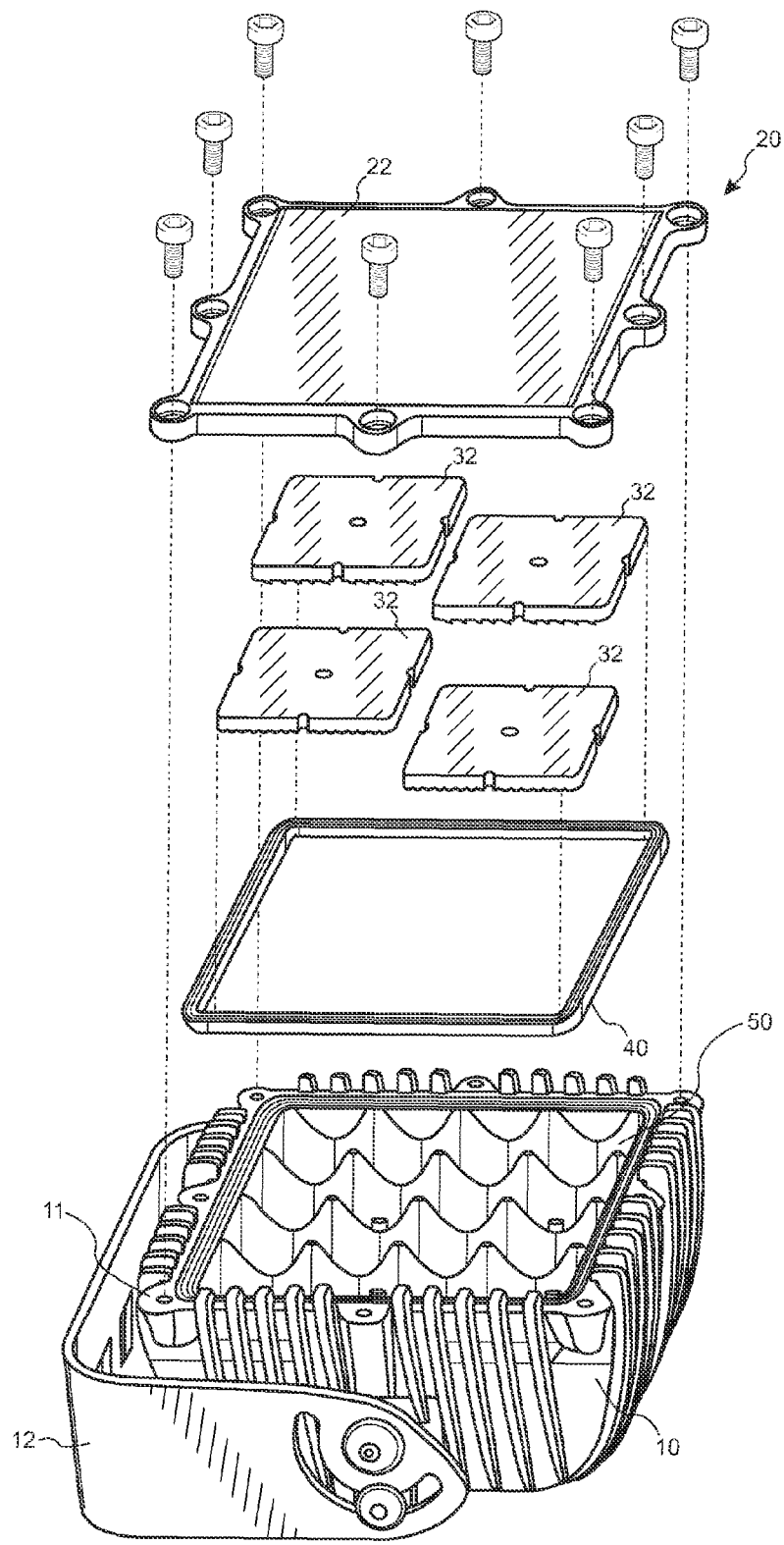
FIG. 1 illustrates an exploded perspective view of a lighting enclosure or fixture embodying aspects of the invention.

The embodiments of the invention are described by reference to the illustrations or drawings of embodiments that incorporate aspects or objects of the invention. The embodiments are intended to illustrate aspects of the inven- FIG. 1 illustrates an exploded side perspective showing the components of the lens system for a preferred lighting enclosure including aspects of the invention. The lighting enclosure includes a body 10 comprising a concave structure having at least a rear wall and a side-wall 11 having a side-wall perimeter edge. The rear wall comprises an inner and protected mounting surface 13 for the power circuitry and circuit boards upon which light sources such as LEDs and associated circuitry is mounted. Further, while FIG. 1. illustrates a square lighting fixture, the invention can be embodied in any size or shape lighting fixture including lighting fixtures having multiple lighting projection directions and fixtures of alternate or non-symmetrical shapes.

The side-wall 11 includes structure, strength, and dimensions to accommodate a mounting bracket 12 for securely coupling the lighting enclosure to another apparatus or structure such as a land or water vehicle. The mounting bracket 12 comprises a substantially "U" shaped structure with ends that extend up a significant portion of the side-wall 11. The mounting bracket 12 is preferably constructed of metal or other sufficiently sturdy material. Moreover, the body 10 may include one or more pivots, preferably located on opposite sides of the side-wall 11 outer surface, to create an axis of rotation and enable axial rotation of the body 10 and associated redirection of the emitted light.

Figure 5:
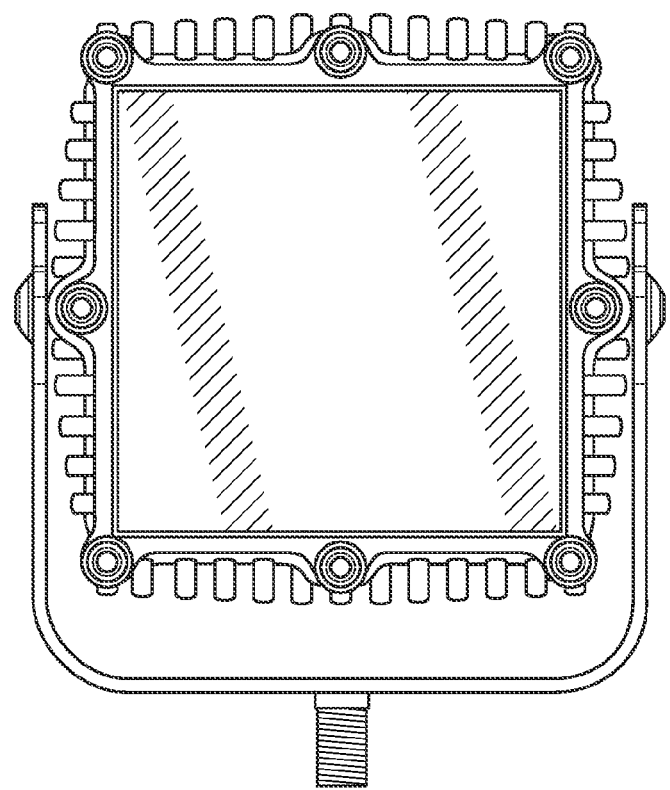
FIG. 5 illustrates a rear view of the light fixture.

In the illustrated embodiment, the pivot comprises a rotational coupling between a side-wall 11 raised portion and the mounting bracket 12. As illustrated in FIGS. 1 and 5, the side-wall 11 raised portion is located substantially equidistant from opposite ends of the side-wall 11 and includes a threaded receptacle for a bolt or screw or other equivalent fastener. In practice, and as illustrated in FIG. 1, the pivot may also include a pivot-lock that prevents rotation and secures the body 10 in one position. The illustrated pivot lock comprises a fastener such as a bolt or screw or pin received within the side-wall 11 surface adjacent the side-wall 11 raised portion that perpendicularly penetrates a channel axially oriented in the bracket and partly around the axis of rotation. The fastener in the pivot lock is loosened and tightened to rotate and secure the body 10 around the axis of rotation, respectively.

Figure 6:
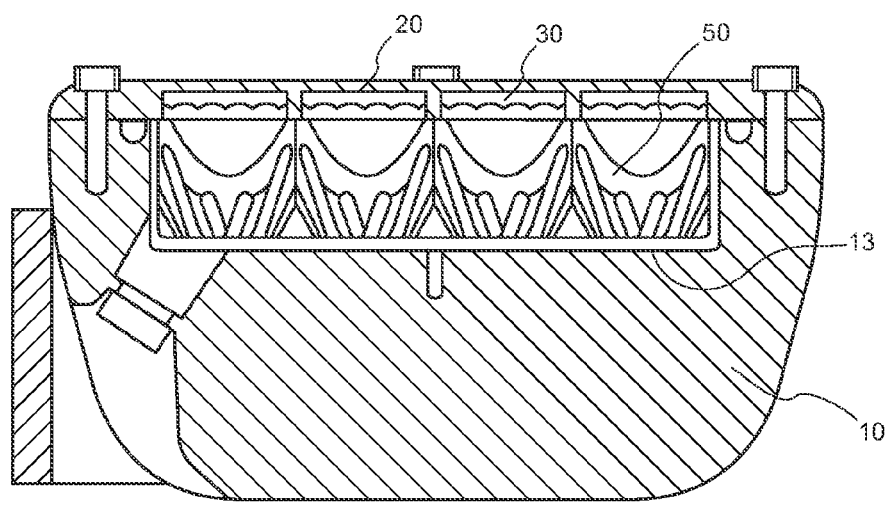
FIG. 6 illustrates a cut-away side view of the assembled light fixture.

The body 10 protects and supports the light source components and provides a mounting surface and structure for the lens system of the embodiment. As illustrated, a preferred lighting enclosure is adapted to accommodate one or more light source modules 50 that fit in the body 10 and adjacent at least one other light source module 50 or the side-wall 11. A light source module 50 preferably comprises an LED light source and a housing that may include or consist of a light collimator such as a Total Internal Reflective (TIR) collimator, or a parabolic reflector collimator, and a plastic or epoxy LED dome or lambertion type LED lens that collectively substantially direct the generated light in a particular direction and may also comprise other mechanical or optical technology such as mechanized positionable lenses or reflectors that direct, distribute, or focus emitted light by changing the relative position of the LED and its associated LED lens and collimator. As illustrated in FIG. 6, the top edges of the LED light source module 50 coincide with the side-wall 11 perimeter edge.

A transparent media 20 together with one or more insertable lenses 30 permits selective and alterable diffusion and direction of generated light and is removably securable to the side-wall 11 perimeter edge using fasteners such as bolts, screws, or clips. See FIG. 1. The transparent media 20 includes a first media surface 23 oriented towards the body 10 (see FIG. 2) and a second surface 22 oriented away from the body 10 (see FIG. 1). The transparent media 20 preferably comprises a material permitting efficient transmission of light emitted from the light source module(s) 50. Accordingly, the transparent media 20 consists of a clear hard plastic such as Polycarbonate or Poly(methyl methacrylate) or any equivalent material having a refractive index of between about 1.2 and 1.8 but preferably about 1.58. The transparent media first surface 23 further includes a transparent media perimeter that contacts the body side-wall 11 perimeter to seal the interior of the lighting fixture and is dimensioned accordingly. A sealing gasket 40 comprised of rubber or nylon or another equivalent sealing material is included between the transparent media 20 and the body side-wall 11 perimeter to create a water resistant union between the transparent media 20 and the body 10 and protect the interior contents of the lighting fixture from exposure to outside elements.

The preferred lenses 30 also preferably consists of a clear hard plastic such as Polycarbonate or Poly(methyl methacrylate), or equivalents and also have a refractive index between about 1.2 and 1.8. Moreover, the transparent media 20 first surface substantially accommodates the shape or finish of the lens first surface 32 so that a substantial amount of the lens first surface 32 areas contacts the transparent media first surface 23 when brought together. For example, in the preferred embodiment, both the transparent media 20 first surface and the lens first surface 32 are complimentary surfaces, and in this case flat or smooth, but other transparent media 20 surface shapes or textures are also compatible and usable within the lens system including without limitation curved, semi-sphered, or domed shaped surfaces.

The illustrated embodiment includes at least two insertable lenses 30 that are removable and also securable within the lighting enclosure and positioned at least ½ inch, and preferably about 11/16 inches from the LED lights and any associated LED lens of the light source modules. The lenses 30 are also orientable, such as by rotation, within the lighting fixture to facilitate directing or distributing light from at least one light source module in a desired projection direction.

Figure 2:
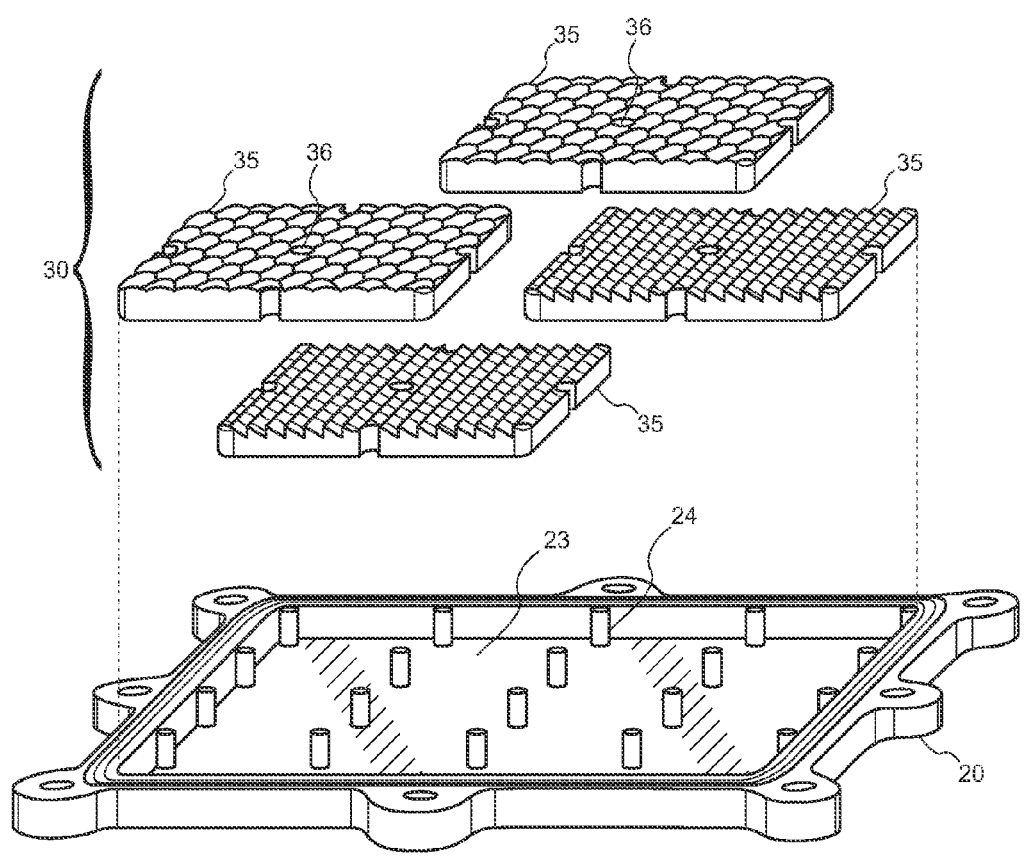
FIG. 2 also illustrates an exploded reverse perspective view of the lens system and illustrates a plurality of removable or insertable lenses 30 can be coupled to, or inserted against a first surface 23 of a transparent media 20 and that alternate insertable lenses having to effect alternate light distribution or light directing characteristics.
Figure 3:
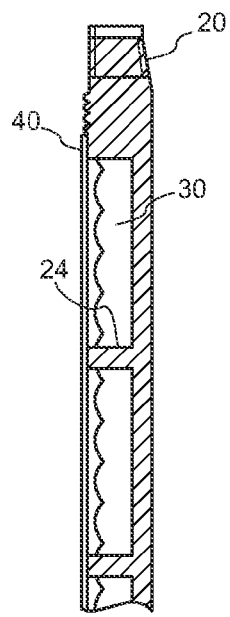
FIG. 3 illustrates a close-up side view showing a portion of removable or orientable lens 30 coupled to the transparent media 20, which has a surface edge in the form of a boss 24 extending from the transparent media first surface 23 and which the lenses 30 makes contact and are deterred from lateral movement relative to the transparent media 20.

A structure on the transparent media 20 and a complementary structure on the insertable lenses 30 deter relative movement between the transparent media 20 and the lenses 30. An exemplary structure on the transparent media 20 comprises an edge or other impediment, such as a positive edge or a negative edge, that is received by or that receives a complementary edge on the insertable lenses 30. As one example, a positive perimeter edge on the transparent media surface 23 receives a single insertable lens 30 having dimensions less than or equal to the transparent media surface 23. The lens 30 is received into a secured position against the transparent media 20 by one dimensional movement (i.e. a direction normal to the transparent media surface 23) and secured against the transparent media 20 by attaching the transparent media 20 to the body 10. As illustrated in an assembled view in FIG. 6, top edges of the light source modules 50 collimators brace or hold the lens 30 in position and prevent movement in the reverse direction away from the transparent media 20. FIGS. 2 and 3 illustrate details of another structure for deterring movement of a plurality of lenses 30 and comprises a positive edge on the surface of the transparent media 20 such as a boss 24, pin, post, or pillar extending substantially perpendicularly from the transparent media first surface 23. The preferred complementary edge comprises a negative edge such as the edge surrounding an appropriately dimensioned aperture, notch, hole 36, or a lens edge channel, oriented substantially perpendicular to the lens first surface 32 and aligned with the boss 24. The lenses 30 are received into a secured position against the transparent media 20 by one dimensional movement (i.e. a direction normal to the transparent media surface 23) and secured against the transparent media 20 by attaching the transparent media 20 to the body 10. The light source modules collimator top edges hold the lenses 30 in position and prevent the lenses 30 from moving in the reverse direction away from the transparent media 20.

As illustrated in FIG. 2, bosses 24 are spaced equidistant from each other in at least one dimension and preferably form a grid or an array. A hole 36 or a lens edge channel 35 receives each boss 24 and each lens 32 includes either at least one hole 36 or a lens edge channel 35, or both. Alternatively, each lens edge can make flush contact with adjacent lens edges and the transparent media 20 perimeter edge to deter relative lateral movement. In embodiments including a plurality of light source modules 50, each light source module 50 has a module-housing perimeter and the lens edges and each boss 24 aligns with the module-housing perimeter. Moreover, each insertable lens 30 is positioned above a subset of four light source modules but alternatively may include one lens 30 for each light source module 50 or for an alternate subset of the plurality of light source modules.

Figure 4:
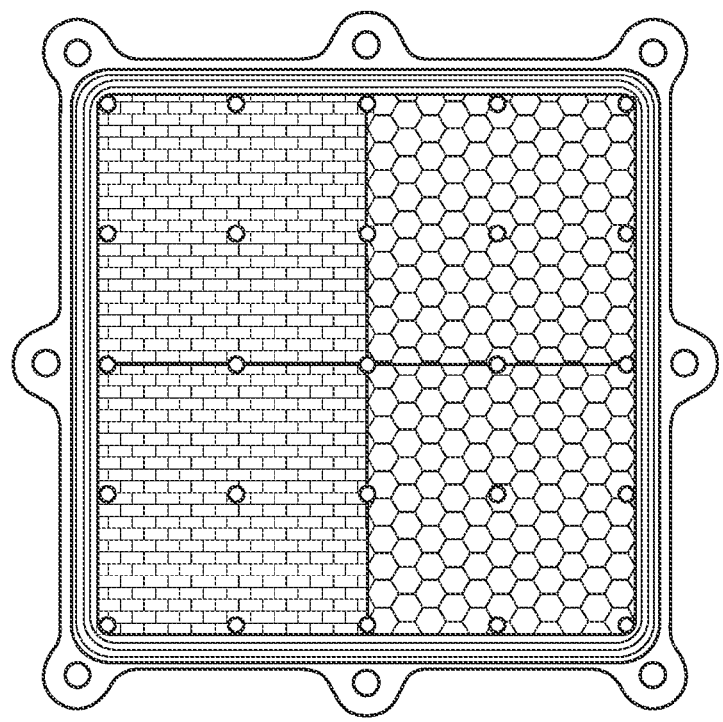
FIG. 4 illustrates a back view of the transparent media 20 showing the edges 24 arranged in a grid or array.

A first preferred lens 30 shown in FIG. 2 predominantly diffuses light emitted from the light source module(s) and includes without limitation diffusing lenses including a plurality of convex rectangular offset surfaces (e.g. "pillowed" lenses). FIG. 4 shows another view of the convex rectangular offset surfaces in front of the left half of the transparent media and within its perimeter edge. The right half of the transparent media and within its perimeter edge is covered by a second diffusing lens having a bulging honeycombed surface. Another preferred lens 30 (also shown in FIG. 2) comprises a light directing lens that predominantly redirects, focuses, or collimates light from the light source module(s) 50. The light directing lens may be implemented by a collimating lens or equivalents having a plurality of rows or columns of stepped or inclined lens surfaces having uniform or consistent inclination or sloped facets throughout the lens 30 to refract angled incident generated light.

While the above lenses are described as preferred, any and most lens designs are capable of being used with the embodiment including combination lenses that predominantly diffuses a first portion of the generated light incident upon the first portion, and predominantly directs a second portion of generated light incident upon the second portion. Thus, any lens that alone or in combination, diffuses, blocks, colors, reflects, distributes, focuses, or directs, light is useable as one lens 30, or as a plurality of lenses 30, in the lens system. As an example, one lens 30 can substantially cover the entire first surface 23 of the transparent media 20. Or, as illustrated in FIGS. 1-3 illustrate at least two, or a plurality of, insertable lenses 30 are removably securable or orientable in the lighting fixture. The lenses 30 are positioned substantially adjacently and substantially cover the transparent media first surface 23 and diffuse, alter, or direct substantially all of the light from the light source modules. In alternate configurations, less than all of the lenses 30 are used and less than substantially all of the light from the light source modules is directed or diffused.

The lens system described herein enables a lighting fixture having a selectable lighting characteristic or combination thereof. The lenses 30 of the system are inserted, removable, and/or orientable to enable selectable distribution or direction of light to accommodate various mounting alternatives. For example, inserting a light directing lens 30 designed to refract light at an angle downward from the angle of incidence facilitates mounting a lighting fixture to the cab or top of a vehicle. Alternatively, removal of the lens 30 or lenses 30 enables light to be emitted substantially directly forward from the vehicle and facilitates mounting the lighting fixture to a vehicle grill. Inserting a diffusing lens 30 creates a wider distribution of light, which may be appropriate for both mounting options. A preferred diffusing lens 30 reduces the luminance directly in front of the lighting fixture at 10 meters by at least half the luminance directly in front of the lighting fixture at 10 meters with the diffusing lens removed. Or alternatively, the luminance at 10 meters normal from or to the transparent media surface 22 with the insertable lens 30 removed, is at least twice the luminance at 10 meters normal from or to the transparent media surface 22 with the insertable lens 30 included The lighting characteristic may also be selectively altered by combining diffusing and light directing lens designs in the same fixture and by powering-on one or a subset or all of the a plurality of LEDs positioned proximately to each lens. One or more light directing lenses 30 and light diffusing lenses 30 are used in the same lighting fixture on different parts of the transparent media 20. Particularly, a diffusing lens 30 is oriented above a first set of light source modules 50 and a directing lens 30 is positioned above a second set of light source modules and the first or second set of light source modules powered-on depending on the desired lighting characteristic. The first set of light source modules is powered-on for diffused light and the second set of light modules is powered-on for directed light, and both first and second set of light modules are powered on for a combination of diffuse and directed light. Finally, selectively altering the lighting characteristic also includes selectively orienting a collimating light directing lens 30 to refract and direct generated angled incident light in a particular direction from the lighting fixture. For example, in one orientation, a Fresnel or collimating light directing lens 30 refracts incident light downward from the angle of incident light, and turning or spinning the lens 30 one hundred eighty degrees about the boss 24 refracts incident light upward from the angle of incidence. In the first orientation, the lens 30 has a lens portion a first refracting angle to a normal to the transparent media first surface 23 and a second refracting angle to the normal in the second orientation. Similarly, rotating or spinning the light directing lens 30 around the boss 24 ninety degrees directs results in a third refracting angle to the normal and directs light to the left, and rotating the lens 30 around the boss 24 two hundred seventy degrees results in a third refracting angle to the normal and directs light to the right.

Though the specification has described particular embodiments, changes and modifications may be made without departing from the spirit and scope of the claims.

What is claimed is:

1. A lens system for a lighting enclosure, said lighting enclosure including a plurality of light source modules, said lens system comprising:
   a transparent media removably attachable to the lighting enclosure, the transparent media including a substantially smooth media surface and a surface edge extending substantially perpendicularly away from the media surface; and at least two insertable lenses attached to the transparent media, the insertable lenses each including a substantially smooth lens surface contacting the media surface and a negative edge contacting the surface edge to deter movement of the insertable lenses relative to the transparent media; wherein one of the at least two insertable lenses is selected from lenses consisting of, Fresnel, collimating, and focusing lenses and another of the at least two insertable lenses are selected from the group consisting of Lambertion, scattering, and diffusing lenses; wherein the lighting enclosure has at least one lighting characteristic selected from the group consisting of collimated light or diffused light; and wherein the lighting enclosure has a first lighting direction projection and a second lighting direction projection different than the first lighting direction projection.

2. The lens system in claim 1 wherein, the surface edge comprises an edge selected from the group consisting of posts, studs, pegs, pins, nubs, pillars, troughs, channels, holes, and depressions.

3. The lens system in claim 2 wherein, the lighting enclosure includes a plurality of light source modules, each having a module-housing perimeter, the transparent media has a plurality of surface edges that align with the module-housing perimeter.

4. The lens system in claim 3 wherein, the lighting enclosure has at least two lighting characteristics selected from the group consisting of collimated light or diffused light.

5. The lens system in claim 1 wherein, the at least one light source module has a light source module perimeter and the surface edge is aligned directly with the light source module perimeter.

6. The lens system in claim 5 wherein, the transparent media has a transparent media perimeter and the surface edge extends from the media surface within the transparent media perimeter.

7. The lens system in claim 1 wherein, the lighting enclosure has at least two lighting characteristics selected from the group consisting of collimated light or diffused light.

8. The lens system in claim 1 wherein, the transparent media and the insertable lenses each have a refractive index between about 1.2 and 1.9.

9. The lens system in claim 1 wherein, the lighting enclosure has a first lighting direction projection with the insertable lenses in a first orientation and a second lighting direction projection with the insertable lenses in a second orientation.

10. The lens system in claim 1 wherein, luminance at 10 meters measured perpendicularly to the transparent media surface with the insertable lenses removed, is at least twice the luminance at 10 meters measured perpendicularly to the transparent media surface with the insertable lenses included.

11. A lens system for a lighting enclosure, said lighting enclosure including a plurality of light source modules, said lens system comprising:
a transparent media including a media surface and a surface edge extending substantially perpendicularly away from the media surface, the transparent media removably attachable to the lighting enclosure; and
at least two insertable lenses attached to the transparent media, the at least two insertable lenses positioned in contact with the media surface, in contact with the surface edge, and deterred from lateral movement by the contact; wherein one of the at least two insertable lenses is selected from the lenses consisting of, Fresnel, collimating, and focusing lenses and another of the at least two insertable lenses is selected from the group consisting of Lambertion, scattering, and diffusing lenses; wherein the lighting enclosure has at least one lighting characteristic selected from a group consisting of collimated light or diffused light; and wherein the lighting enclosure has a first lighting direction projection and a second lighting direction projection different than the first lighting direction projection.

12. The lens system in claim 11 wherein, the lighting enclosure includes a plurality of light source modules, each having a module-housing perimeter, the transparent media has a plurality of surface edges that align with the module-housing perimeter.

13. The lens system in claim 12 wherein, the lighting enclosure has a first lighting direction projection with the at least two insertable lenses in a first orientation and a second lighting direction projection with the at least two insertable lenses in a second orientation.

14. The lens system in claim 13 wherein, the second orientation is an angle selected from the angles consisting of 90, 180, and 270 degrees.

15. The lens system in claim 11 wherein, the transparent media and the at least two insertable lenses each have a refractive index between about 1.2 and 1.9.

16. The lens system in claim 11 wherein, luminance at 10 meters measured perpendicularly to the transparent media surface with the at least two insertable lenses removed, is at least twice the luminance at 10 meters measured perpendicularly to the transparent media surface with the at least two insertable lenses included.

17. The lens system in claim 11 wherein, the lighting enclosure has a first lighting direction projection with the at least two insertable lenses in a first orientation and a second lighting direction projection with the at least two insertable lenses in a second orientation.

18. The lens system in claim 11 wherein, luminance at 10 meters measured perpendicularly to the transparent media surface with the at least two insertable lenses removed, is less than twice the luminance at 10 meters measured perpendicularly to the transparent media surface with the at least two insertable lenses included.

19. A method of changing the lighting characteristics of a lighting enclosure that has a plurality of light source modules, the method comprising:
attaching substantially smooth lens surfaces of at least two lenses, respectively, to a substantially smooth surface of a transparent media that is removably attachable to the lighting enclosure, such that a negative edge of the at least two lenses contact a surface edge of the transparent media; wherein one of the at least two lenses is selected from lenses consisting of Fresnel, collimating, and focusing lenses and another of the at least two lenses is selected from lenses consisting of Lambertion, scattering and diffusing lenses; and wherein the lighting characteristic is selected from the group consisting of collimated light or diffused light; and
attaching the transparent media to the lighting enclosure after attaching the at least two lenses to the transparent media, the lighting enclosure having a first lighting direction projection and a second lighting direction projection different than the first lighting direction projection.

20. The lens system in claim 19 further comprising, positioning each of the at least two lenses adjacent to a corresponding subset of the light source modules; and powering-on a corresponding subset of the light source modules.

* * * * *